July 24, 1923.
W. G. MARTIN
SPRING OILING DEVICE
Filed Aug. 18, 1922
1,462,562
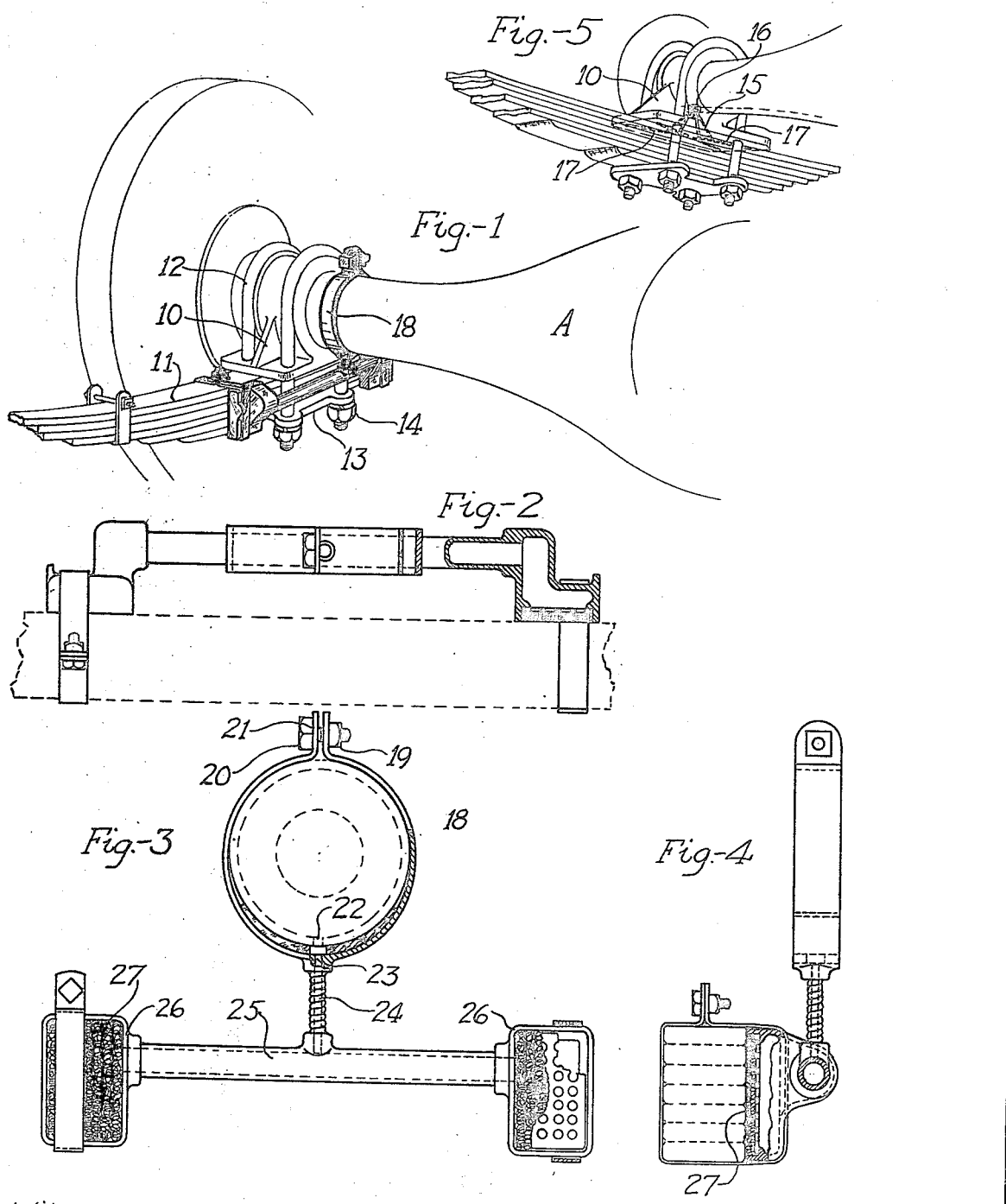

Patented July 24, 1923.

1,462,562

UNITED STATES PATENT OFFICE.

WILFRED G. MARTIN, OF PEORIA, ILLINOIS.

SPRING-OILING DEVICE.

Application filed August 18, 1922. Serial No. 582,655.

*To all whom it may concern:*

Be it known that I, WILFRED G. MARTIN, a citizen of the United States of America, residing at Peoria, in the county of Peoria and State of Illinois, have invented certain new and useful Improvements in Spring-Oiling Devices, of which the following is a specification.

My invention relates to spring oilers and more particularly to a spring oiler adapted to be used in connection with the formal differential housing of a motor car.

The object of my invention is in the provision of a simple means used in connection with, or adapted to be attached to a differential housing, whereby the spring, mounted thereunder, is oiled automatically therefrom.

Another object of my invention is in the provision of a simple mechanism for automatically oiling a spring from the differential housing without the use of auxiliary attachments, this particular structure being adapted for use on new cars.

A further object of my invention is in the provision of an auxiliary means utilizing the same principle, whereby my invention may be applied to old vehicles.

Still further objects of my invention will appear in the following specification in connection with the annexed drawings in which:

Figure 1, is a perspective view of my specific oiler showing its attachment to the conventional differential housing.

Figure 2, is an enlarged detail partially broken away showing a portion thereof.

Figure 3, is a cross sectional view through the oiling device.

Figure 4, is a cross section of a portion thereof enlarged to show the particular attachment to the spring member and, Figure 5, is a perspective showing of my principle of oiling as applied or adapted to be incorporated in a new vehicle.

Referring to the drawings, I have shown generally at A the conventional differential housing of an automobile which carries therein the differential gears and an axle furnishing driving means for the wheels, none of the above being shown.

In Figure 1, I have illustrated a conventional form of mounting a rear spring, this includes a block 10, surrounding the differential housing. The spring 11, is swung below this block and is held thereagainst in an immovable position by the yokes or straps 12, which engage a plate 13, at the under side of the spring. The spring is clamped between the block 10, and plate 13, by means of the nuts 14, upon the threaded ends of the yoke members 12.

In Figure 5, I have shown a form which includes, in the simplest manner, the principle of my invention. A similar mounting is shown as that in Figure 1. This particular form of my invention would be more adaptable to new vehicles inasmuch as the particular steps in this construction of my oiling system would best be done before assembly. This, however, is not absolutely necessary.

Apertures 15, in the block 10, lie adjacent similar apertures 16, in the lower portion of the differential housing. Grooves 17, upon the lower face of the block 10, radiate from the lower ends of the holes 15. These grooves provide means for distributing the oil which seeps automatically from the inner portion of the differential housing to the outer edges of the spring, whence it continues out the sides of the spring and oils the respective leaves thereof through their sides.

The specific form of oiler which I have shown in Figures 1 to 4, is one that may be readily attached to vehicles now in use, or rather old cars. This oiler is adapted to be applied quickly to the differential housing and placed in operative connection therewith by merely making a single opening in the lower portion of said housing.

My specific oiler includes a broken band 18, adapted to fit about the differential housing or rather about the axle portion thereof. Means for adjustably and fixedly holding this band about the housing is provided in the nut 19, and bolt 20, in connection with the upstanding lugs 21, on the band 18. Aperture 22, is made in the lower portion of the differential housing, this aperture being adjacent a similar opening in a downwardly protruding portion 23, of the band. A flexible connection 24, provides means for carrying the oil, that automatically seeps from the differential housing, to a laterally disposed connecting pipe 25. It may be said here that the movement of the axle within the differential housing forces the oil through the hole 22. Upon the outer ends of the pipe 25, are disposed the oil chambers 26, similar in construction and adapted to lie against the inner face of the spring member. The oil chambers 26, are formed in such manner that a rather substantial amount of oil may be contained therein. All sides of the chamber are housed except the one adjacent the spring as may be clearly seen in Figures 2 and 4. This face includes a perforated plate adjacent the oil supply chamber and disposed outwardly thereof and adjacent to said plate is a felt pad 27. Flexible bands provide means for fixedly positioning the oiling chambers in their respective and operative positions adjacent the inner face of the spring.

The operation of my specific oiling device is obvious in that the oil from the differential housing is fed to the oiling chambers and passing through the perforated plates maintains the felt member in a saturated condition with the result that a gradual and efficient oiling of the respective leaves of the spring is obtained. The oil applied at this part of the spring, due to the action of said spring, is gradually carried to the outer end thereof, however, in a reasonable quantity.

I have shown my oiling device as applied to the rear housing of a motor car, however, I do not wish to limit my invention to this particular structure as a similar system may be readily applied to the front axle by merely supplying a simple oil reservoir or cup therefor.

Also, I have shown no particular distributing means in the spring, as my invention is in the manner of feeding oil from the differential to the spring itself. My invention might readily be used in connection with various means for oiling the springs within themselves, for instance, with those having grooves upon the under sides of the plates providing lateral flow of the oil.

What I claim is:

1. In a spring oiling device, including, in combination, a differential and axle housing, a spring member, and means, including connections between the differential housing and spring member, whereby oil in the differential is fed, due to the rotary action of the axle therein, to said spring member.

2. In a spring oiling device, including, in combination, a differential and axle housing, a spring disposed thereunder, an oiling block surrounding the differential housing and adapted, by means of yoke members, to be held in engagement with said spring, said oiling block including oil distributing means therein, in engagement with similar openings in the differential housing, whereby the oil within said housing is forced, due to the rotary action of the axle therein, to the outer edges of the spring members.

3. In a spring oiling device, including in combination, a differential and axle housing, a spring member adapted to be swung beneath said housing by means of a yoke member, oiling chambers engaging the sides of the spring, and connections between said oiling chambers and the differential housing, whereby oil is fed therefrom, due to the rotary action of the axle contained therein, to said chambers.

4. In an oiling device, including, in combination, a differential and axle housing, a spring disposed thereunder by means of a yoke member, a band surrounding the housing member and having an aperture therein engaging a similar opening in said housing, oil chambers adapted to lie against the sides of the spring, and oil distributing means connecting said band and oil supply chambers.

5. In a spring oiling device, including, in combination, a spring member, a differential axle housing disposed thereabove and having an oil feeding aperture therein, oiling chambers disposed in operative position adjacent the sides of the spring, and oil distributing means between said chambers and the differential housing, adapted to carry the oil, fed through the opening in said housing, due to the rotary action of the axle therein, to the oiling chambers.

6. In a spring oiling device, including, in combination, a differential and axle housing, a spring disposed thereunder, oiling chambers adapted to lie adjacent the sides of the spring, said chambers including an oil pad and a perforated plate member thereagainst, and an oil distributing means connecting said oiling chambers and the differential housing.

In testimony whereof I affix my signature.

WILFRED G. MARTIN.